(12) United States Patent
Abubakar et al.

(10) Patent No.: US 11,220,092 B2
(45) Date of Patent: Jan. 11, 2022

(54) FILMS AND METHODS OF MAKING THE SAME

(71) Applicant: ExxonMobil Chemical Patents Inc., Baytown, TX (US)

(72) Inventors: Saifudin M. Abubakar, Shanghai (CN); Jieyu Jin, Shanghai (CN); Yinjie Zhang, Shanghai (CN); Yanan Gong, Ann Arbor, MI (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 191 days.

(21) Appl. No.: 16/217,218

(22) Filed: Dec. 12, 2018

(65) Prior Publication Data

US 2019/0203006 A1   Jul. 4, 2019

Related U.S. Application Data

(60) Provisional application No. 62/613,534, filed on Jan. 4, 2018.

(51) Int. Cl.
| | | |
|---|---|---|
| *C08J 7/04* | (2020.01) | |
| *B32B 27/30* | (2006.01) | |
| *C09D 123/12* | (2006.01) | |
| *C09D 123/16* | (2006.01) | |
| *C09D 123/10* | (2006.01) | |
| *C09D 123/14* | (2006.01) | |

(52) U.S. Cl.
CPC .......... *B32B 27/306* (2013.01); *C08J 7/0427* (2020.01); *C09D 123/10* (2013.01); *C09D 123/12* (2013.01); *C09D 123/14* (2013.01); *C09D 123/16* (2013.01); *C08J 2323/12* (2013.01); *C08J 2423/06* (2013.01); *C08J 2423/12* (2013.01); *C08J 2423/16* (2013.01); *C08L 2205/03* (2013.01)

(58) Field of Classification Search
CPC ....... B32B 27/327; B32B 27/34; B32B 25/18; B32B 15/06; B32B 27/12; B32B 15/082; B32B 27/32; B32B 21/08; B32B 25/16; B32B 15/20; B32B 27/08; B32B 27/306; B32B 25/06; B32B 25/10; B32B 25/08; B32B 25/14; B32B 27/36; B32B 21/045; B32B 2571/00; B32B 2307/54; B32B 2307/546; B32B 2270/00; B32B 2419/00; B32B 2307/558; B32B 2307/536; B32B 2307/72; C09D 123/12; C09D 123/16; C09D 123/14; C09D 123/10; C08J 5/18; C08J 7/0427; C08J 2423/14; C08J 2323/12; C08J 2423/12; C08J 2423/06; C08J 2423/10; C08J 2323/14; C08J 2423/16; C08J 2323/10; C08L 23/14; C08L 23/04; C08L 23/10; C08L 2205/03
See application file for complete search history.

(56) References Cited

U.S. PATENT DOCUMENTS

| | | | |
|---|---|---|---|
| 2005/0107529 A1* | 5/2005 | Datta | ................ D01F 6/46 525/70 |
| 2005/0107534 A1* | 5/2005 | Datta | .............. C08F 210/06 525/191 |
| 2010/0125118 A1* | 5/2010 | Brant | ................ C08L 23/12 524/423 |

FOREIGN PATENT DOCUMENTS

| | | |
|---|---|---|
| JP | 2017019145 A | 1/2017 |
| WO | 2004/079083 A | 9/2004 |
| WO | 2016/137558 A | 9/2016 |

* cited by examiner

*Primary Examiner* — Samir Shah

(57) ABSTRACT

Disclosed are films including polypropylene impact copolymers for tarpaulin applications which can provide a combination of desired properties.

20 Claims, No Drawings

FILMS AND METHODS OF MAKING THE SAME

CROSS-REFERENCE OF RELATED APPLICATIONS

This application claims the benefit of Provisional Application No. 62/613,534, filed Jan. 4, 2018, the disclosure of which is incorporated herein by reference.

FIELD OF THE INVENTION

This invention is directed to films, and in particular, to films comprising polypropylene impact copolymers, and methods for making the same.

BACKGROUND OF THE INVENTION

Tarpaulins used as a waterproof cover, or an architectural protective film, etc., are usually prepared by coating both surfaces of polyester woven cloth with a PVC resin and have been widely used for various industrial purposes due to its good flexibility even at a low temperature and high mechanical strength. However, the PVC tarpaulin has gradually become less favored by manufacturers and end-users because its heavy weight caused by PVC's high density and the large amount of dioxin, a lethal hormone to environment, generated during incineration have raised respective concern over inconvenience during use and environmental health. In response, tarpaulins with polypropylene substrates have been developed to replace the traditional PVC tarpaulin as a more environmental friendly alternative. Since then, attempts have been made to seek design of coating layers that can provide desired flexibility and mechanical performance accompanied by strong bonding strength with such polypropylene substrate.

Thermoplastic olefins (TPOs), known to deliver a well-combined fulfillment in flexibility, durability, and resistance to ultraviolet, ozone, and chemical exposure, have long been among the most popular selection of materials for outdoor applications, including tarpaulin and roofing products. Examples of the most commonly used TPO polymers include those containing a high content of rubber, such as those sold by LyondellBasell Industries N.V. under the Hifax™ or Adflex™ tradenames, which resin is a polymer alloy of simultaneously produced rubber and polypropylene. Notwithstanding the overall performance appealing to coating layers of tarpaulins with polypropylene substrates, such solutions fail to penetrate a broader range of end-use markets beyond limited high-end applications under pressure from manufacture cost control and tight supply of the TPO materials. Thus, it is viewed as a difficulty by manufacturers for tarpaulin applications to explore further potential of cost-effectiveness with the available selection of TPO polymers while maintaining overall performance at a comparable level for use as coating layers to be adhered to a polypropylene substrate of tarpaulins.

Japan Patent Publication No. 2017-019145 discloses a tarpaulin having a base fabric and resin layers formed each on both surfaces of the base fabric. In the tarpaulin, the resin layers are formed of a resin composition for the tarpaulin having an MFR at 190° C. of 0.1-30 g/10 min in accordance with Japanese Industrial Standard JIS K7210. In the tarpaulin, the resin composition for the tarpaulin contains, based on 100 pts. mass of the resin content including at least 10 mass % of an unsaturated ester unit, 15-50 pts. mass of a polymer type permanent antistatic agent, 0.1-3.0 pts. mass of a lubricant and 0.05-0.5 pts. mass of an antioxidant.

WO 2016/137558 provides roofing membranes that comprise a blend composition of propylene-based elastomer, thermoplastic resin, flame retardant, and ultraviolet stabilizer. In some embodiments, the blend compositions further comprise polyalphaolefin.

WO 2004/079083 relates to an olefinic tarpaulin prepared by melting and mixing an olefinic copolymer, an olefinic copolymer comprising randomly-coupled ethylene and propylene or vinylacetate, and styrene-ethylene-butane block copolymer in a single screw extruder, and coating the resulting high flexibility and toughness composition on one or both surfaces of a polypropylene woven cloth (multifilaments) or polyethylene woven cloth (split yarns), and a method for preparing the same. The olefinic tarpaulin comprises a woven cloth formed by weaving polypropylene or polyethylene, and resin layers formed by melting and mixing at least one of ethylene-propylene copolymer and ethylene-vinyl acetate copolymer, and styrene-ethylene-butane block copolymer, and styrene-ethylene-butane block copolymer, and coating the resulting composition on one or both surfaces of the woven cloth layer.

That said, there remains an intense demand for new design of tarpaulin coating layers that deliver reliable compatibility to polypropylene substrates without compromising any other desired property. Applicant has found that the aforementioned objective can be achieved by employing a propylene-based impact copolymer (ICP) featuring high toughness, in a blend with a propylene-based elastomer, to formulate a coating layer for adhesion to polypropylene substrates. With improvement in performance profile well established, including flexibility and ease of processing, accompanied by enhanced bonding strength between the coating layer and the polypropylene substrate, such design can benefit the tarpaulin industry with more leverage for choice of more cost-effective polymer materials, which used to be restricted by short supply of the conventionally used TPO materials. This makes the inventive film comprising such coating layer particularly qualified for replacing the conventional solution as a promising alternative valued by future market.

SUMMARY OF THE INVENTION

Provided are films comprising polypropylene impact polymers, methods for making such films, and tarpaulins made therefrom.

In one embodiment, the present invention encompasses a film, comprising a coating layer comprising: (a) from about 30 to about 60 wt % of a propylene-based elastomer, based on total weight of polymer in the coating layer, comprising at least about 60 wt % propylene-derived units and about 3 to about 25 wt % ethylene-derived units, based on the weight of the propylene-based elastomer, wherein the propylene-based elastomer has a heat of fusion of less than about 80 J/g; (b) from about 30 to about 60 wt % of an impact copolymer (ICP), based on total weight of polymer in the coating layer, the ICP comprising a polypropylene homopolymer and within the range of from about 10 to about 45 wt % of propylene copolymer based on the weight of the ICP, wherein the propylene copolymer comprises from about 7 to about 60 wt % ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from about 10 to about 50 g/10 min and an Elongation at Break of greater than 60%; and (c) from about 1 to about 10 wt % of LDPE.

In another embodiment, the present invention relates to a method for making a film comprising a coating layer, comprising the steps of: (a) preparing a coating layer comprising (i) from about 30 to about 60 wt % of a propylene-based elastomer, based on total weight of polymer in the coating layer, comprising at least about 60 wt % propylene-derived units and about 3 to about 25 wt % ethylene-derived units, based on the weight of the propylene-based elastomer, wherein the propylene-based elastomer has a heat of fusion of less than about 80 J/g, (ii) from about 30 to about 60 wt % of an ICP, based on total weight of polymer in the coating layer, the ICP comprising a polypropylene homopolymer and within the range of from about 10 to about 45 wt % of propylene copolymer based on the weight of the ICP, wherein the propylene copolymer comprises from about 7 to about 60 wt % ethylene and/or $C_4$ to $C_{10}$ α-olefin derived units and the remainder propylene-derived units based on the weight of the propylene copolymer, the ICP having an MFR (230° C./2.16 kg) within the range of from about 10 to about 50 g/10 min and an Elongation at Break of greater than 60%, and (iii) from about 1 to about 10 wt % of LDPE; and (b) forming a film comprising the coating layer in step (a).

The film described herein or made according to any method disclosed herein may have at least one of the following properties: (i) a processing neck-in ratio of at most about 28% at a die gap of 1 mm for a coating thickness of (50±10%) μm; (ii) a seal strength at a sealing temperature of 250° C. of at least about 5% higher when sealed with a substrate consisting essentially of a polypropylene homopolymer; (iii) a tensile at break of at least about 80% higher in the Machine Direction (MD) and of at least about 50% higher in the Transverse Direction (TD); (iv) an Elongation at break of at most about 20% higher in MD and of at most about 27% in TD; and (v) a puncture resistance of at least about 20% higher in force and of at least about 15% higher in energy at break, compared to that of a film comprising an alloy of polypropylene and rubber in place of the propylene-based elastomer and the impact copolymer but otherwise identical in terms of film formulation, thickness and structure.

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polypropylene," "propylene polymer," and "propylene-based polymer" mean a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)). Furthermore, the term "polypropylene composition" means a composition containing one or more polypropylene components.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers.

For purposes of this invention and the claims thereto, an ethylene polymer having a density of 0.910 to 0.940 g/cm³ is referred to as a "low density polyethylene" (LDPE); an ethylene polymer having a density of 0.890 to 0.940 g/cm³, typically from 0.915 to 0.930 g/cm³, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a $g'_{vis}$ of 0.97 or above, preferably 0.98 or above); and an ethylene polymer having a density of more than 0.940 g/cm³ is referred to as a "high density polyethylene" (HDPE).

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

As used herein "consisting essentially of" means that the described/claimed composition does not include any other components that will materially alter its properties by any more than 5% of that property, and in any case, does not include any other component to a level greater than 3 wt %.

As used herein, "neck-in" which is influenced by extrudate swelling and, to lesser degree, by surface tension effects refers to the difference between the die width and the web width at the taken-off position. Measured neck-in values (at constant output) will remain constant or decrease as the drawdown rate increases.

As used herein, "seal strength" refers to the force to separate two layers in accordance with ASTM F-88 which is incorporated by references. For example, this is the force necessary to separate two layers of a defined width, such as one inch or 15 mm, by pulling. As used herein, the seal strength is measured herein based on ASTM F88 using a Zwick Tensile Tester pulled at 90° angle from the seal at a speed of 500 mm/min after samples with a width of 15 mm are conditioned in the constant temperature lab for at least 40 hours at a temperature of 23° C.±2° C. and at a relative humidity of 50%±10%, which method is specifically developed by Applicant based on ASTM F88 and is herein referred to as "EMC method".

Impact Copolymer

In one aspect of the invention, the impact copolymer that can be used for the film described herein has a relatively low level of ethylene comonomer incorporation and low copolymer incorporation. This is unique because most catalyst systems used to produce the polypropylene component and copolymer components of ICPs tend to incorporate too large an amount of ethylene-derived units (or other comonomer) into the copolymer component. This occurs because most polyolefin catalysts, especially Ziegler-Natta catalysts that are titanium/magnesium based, tends to lose activity over time (the active metal center $Ti^{4+}$ changes to $Ti^{3+}$ with resident time in the reactor and the $Ti^{3+}$ site prefers to incorporate ethylene monomer over propylene monomer), thus, a very high incorporating catalyst is used to compensate for this. In addition, most catalyst systems are not able to produce ICP granules with a desirable flowability to prevent clogging in the subsequent polymerization-finishing transfer lines. It is found that an ICP including a propylene copolymer having a relatively low ethylene or other comonomer (less than 45 wt % based on the copolymer) level can increase the elongation, impact resistance and gloss of the ICP. A magnesium chloride supported titanium catalyst with one or more external donors described in U.S. Pat. No. 6,087,495 was used to produce the ICP described herein. The improved ICP has a higher porosity in the homopolymer granules which allows for a higher content of the ethylene-propylene copolymer phase. The propylene-based ICP described herein is particularly suitable for appliances and other articles and components where both toughness and glossy appearance are important.

In any embodiment, the ICPs described herein are made by physically blending polypropylene homopolymer component(s) and propylene-copolymer component(s), or made in a single reactor process using dual catalysts to produce the different components, or are produced in a series reactor process to produce individual components that are further combined in situ, or in one or more of the reactors. Most preferably, the ICPs described herein are produced in series reactors wherein the polypropylene homopolymer is first produced in one or more slurry reactors by contacting a catalyst and monomers, preferably propylene, such as in slurry-loop reactors well known in the art, followed by combining the same catalyst and formed homopolymer in a single gas-phase reactor with monomers, preferably propylene and ethylene and/or $C_4$ to $C_{10}$ α-olefins, to produce the propylene copolymer such that the copolymer imbeds itself in the homopolymer as discrete domains with the homopolymer as a matrix or "continuous" phase. The MFR of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus is described in U.S. Pat. Nos. 9,000,106 and 8,076,419 (column 6, line 6 to column 7, line 16). The systems and processes disclosed therein can be used in a "balanced" reactor scheme where two slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

In an embodiment, the ICP comprises a polypropylene homopolymer and within a range of from 10 or 15 or 20, or 22, or 24 wt % to 26, or 28, or 30, or 35, or 40, or 45 wt % of propylene copolymer based on the weight of the ICP, wherein the copolymer comprises from about 7, or 10, or 15, or 20, or 25, or 30, or 35 wt % to 40 or 45, or 50, or 55 or 60 wt % ethylene, 1-butene, 1-hexene, and/or 1-octene derived units and from 80 to 40 wt % propylene-derived units based on the weight of the propylene copolymer, the propylene-based impact copolymer having a MFR within a range of from 10, or 15, or 20, or 26 g/10 min to 30, or 36, or 40, or 50 g/10 min and an Elongation at Break of greater than 60, or 70, or 80, or 90, or 100% (or within a range from 60 or 80% to 120, or 150, or 300, or 400%). Such an ICP tends to have an improved toughness (T-ICP) compared to other ICPs, described more herein. Most preferably the propylene copolymer is an ethylene-propylene copolymer.

Also, in an embodiment the ICP comprises a polypropylene homopolymer and within a range of from 6, or 8, or 10 wt % to 14, or 16, or 20 wt % of propylene copolymer based on the weight of the ICP, wherein the propylene copolymer comprises from 20, or 25, or 30, or 35 wt % to 40, or 45, or 50, or 55, or 60 wt % ethylene, 1-butene, 1-hexene and/or 1-octene derived units and from 80, or 75, or 70, or 65 wt % to 60, or 55, or 50, 45, or 40 wt % propylene-derived units based on the weight of the propylene copolymer, the ICP having a MFR within a range of from 5, or 8, or 12 g/10 min to 20, or 30, or 40, or 50 g/10 min and a surface gloss at 60° of from 40, or 50 to 80, or 90. Such an ICP tends to have an improved gloss (G-ICP) compared to other ICPs, described more herein. Most preferably the propylene copolymer is an ethylene-propylene copolymer.

In an embodiment, the ICP has a molecular weight distribution (Man) within a range from 4, or 5 to 7, or 8. In any embodiment the size exclusion chromatograph (SEC) chromatogram is unimodals, meaning there is only one discernable SEC maximum, which may or may not comprise a shoulder.

In an embodiment, the total comonomer derived unit content, preferably ethylene derived units of the ICP, is within a range from 2 or 2.5 wt % to 4, or 6, or 10, or 16 wt % by weight of the ICP.

In an embodiment, the melting point temperature of the ICP is greater than 155, or 160, or 162° C., or within a range from 155, or 160, or 162° C. to 170 or 180° C.

In an embodiment, the polypropylene homopolymer portion of the ICP has an $M_w/M_n$ within a range of from 3.0, or 3.5, or 4.0 to 4.5, or 5.0, or 6.0, or 7.0, or 8.0, or 9.0; and the polypropylene homopolymer portion also has an $M_z/M_w$ of less than 4, or 3.4, or 3.2, or 3.0, or 2.8, or 2.6, or 2.4, or within a range from 2 to 2.5, or 2.6, or 2.8, or 3, or 3.2, or 3.4, or 4. By "polypropylene homopolymer" what is meant is a polymer comprising within a range of from 0, or 0.01, or 0.1, or 0.5 to 2.0, or 3.0 wt %, by weight of the polymer, of ethylene, or $C_4$ to $C_{10}$ α-olefin-derived units, and most preferably refers to a polymer consisting of propylene-derived units.

In any embodiment the "propylene copolymer" or "copolymer" is a polymer comprising ethylene, 1-butene, 1-hexene and/or 1-octene derived units, most preferably ethylene derived units.

In an embodiment the isopentad value for the polypropylene homopolymer is greater than 92, or 94, or 96%, and less than or equal to about 99%.

In an embodiment, in particular for an ICP with high gloss, the MFR of the polypropylene homopolymer is within a range from 5, or 10, or 15 g/10 min to 20, or 25, or 30, or 40 g/10 min. In embodiments for an impact copolymer with high toughness, the polypropylene homopolymer has a MFR within a range from 80 or 100 g/10 min to 120, or 140, or 160, or 180, or 200, or 220 g/10 min.

In an embodiment, the xylene cold soluble fraction of the ICP described herein, which corresponds to the propylene copolymer portion of the ICP, has a number average molecular weight ($M_n$) within a range from 50,000 or 60,000 g/mole to 80,000 or 100,000 g/mole. In an embodiment, the propylene copolymer has a weight average molecular weight ($M_w$) within a range from 150,000, or 180,000, or 200,000 g/mole to 300,000, or 350,000, or 400,000 g/mole. And further, the propylene copolymer component may have a z-average molecular weight ($M_z$) within a range from 400,000, or 450,000, or 500,000, or 550,000 g/mole to 650,000, or 700,000, or 800,000, or 900,000 g/mole. The propylene copolymer component may have an Mz/Mw of less than 3.0, or 2.8, or 2.6, or 2.4, or within a range from 2.0 to 2.5, or 2.6, or 2.8.

In an embodiment, the propylene copolymer portion of the ICP described herein has an $M_w/M_n$ within a range of from 3.0, or 3.5, or 4.0 to 4.5, or 5.0, or 6.0, or 7.0, or 8.0, or 9.0. The propylene copolymer component has an $M_z/M_w$ of less than 4, or 3.4, or 3.2, or 3.0, or 2.8, or 2.6, or 2.4, or within a range from 2 to 2.5, or 2.6, or 2.8, or 3, or 3.2, or 3.4, or 4.

In an embodiment, the propylene copolymer portion of the ICP described herein has a melt flow rate within a range from 0.1 or 0.2 g/10 min to 0.6, or 0.8, or 1, or 2 g/10 min.

Also, in an embodiment, the propylene copolymer has an intrinsic viscosity (IV) within a range from 2 or 2.2 dL/g to 4, or 4.4, or 5, or 6 dL/g.

The ICP described herein is heterogeneous, meaning that there are domains of copolymer within a continuous phase of polypropylene homopolymer. Advantageously, the copolymer domains are relatively small, and the two domains are more miscible than prior art ICP heterogeneous domains. Thus, in preferred embodiments of the disclosure the polypropylene homopolymer forms a continuous phase and the copolymer, preferably an ethylene-propylene copolymer, forms copolymer domains having an average size (diameter) of less than 10, or 8, or 5, or 4, or 2 or 1 µm, or within a range of from 0.40, or 0.45, or 0.50 µm to 0.80, or 0.85, or 0.90, or 1, or 2, or 4, or 5, or 8, or 10 µm. Due to this nature of the ICP described herein, the surface of the solid material may have high gloss, and thus, the surface gloss is greater than 80, or 85, or 90 (ASTM D523), or greater than 70, or 75, or 80, or 85 measured at any one of 20, 60, or 85 degrees.

The ICP described herein can desirably be made in a reactor in granules without further processing if desired. Thus, the impact copolymer in a preferred embodiment comprises reactor grade granules having an average particle size within a range of from 1200, or 1300, or 1400, or 1500 µm to 2000, or 2400, or 2800 µm and produced at a rate greater than 30,000, or 35,000 or 40,000, or 45,000 lbs/hr (13,620 kg/hr or 15,890 kg/hr, or 18,160 kg/hr, or 20,430 kg/hr). There are any number of ways of making the ICP described herein, but preferably it is manufactured in a two-step, sequential processes that utilizes a solution or slurry-type polymerization process in the presence of a polymerization catalyst, followed by transfer of the homopolymer-active catalyst to a gas phase reactor where it is further contacted with α-olefin comonomer and propylene to form the copolymer domains within the continuous phase of polypropylene homopolymer. Such processes, individually, are well known in the art, and described for instance in U.S. Pat. No. 8,076,419.

When manufacturing either the homopolymer or copolymer, the properties of each can be tailored to meet certain desired needs to impart desirable final properties in the ICP described herein, and there is a range of desirable properties that the ICP described herein can possess. For instance, the level of hydrogen in the reactor(s) can be adjusted, as can the polymerization temperature, residence time, identity of solvent (if any), as well as other factors.

In an embodiment, the "tough" ICP (T-ICP) has a Heat Deflection Temperature (HDT) within a range of from 70, or 75, or 80, or 85° C. to 95, or 100, or 115, or 125° C.; or greater than 80, or 84, or 86, or 80, or 92° C. at 66 psi (ASTM D648). In an embodiment, the G-ICP has a HDT within a range of from 100, or 110° C. to 130, or 135, or 140, or 150° C.; or greater than 100 or 110° C. at 66 psi (ASTM D648).

Also, in an embodiment the ICP has a flexural modulus (1% Secant, ASTM D790A) of greater than 200, or 220, or 250, or 300 kpsi, or within a range of from 120, or 130, or 140 kpsi to 200, or 225, or 250, or 300, or 400 kpsi. The tensile strength at yield (ASTM D638) of the ICP described herein is preferably within a range of from 2500 or 2600 or 2800 psi to 3000, 3500, or 4500, or 5500 psi; or greater than 2800, or 2900, or 3000, or 3200 psi.

One advantage of the T-ICP is its desirable impact properties. For instance, the notched Izod impact at 23° C. as measured by ASTM D256A of the ICP described herein is preferably greater than 4, or 5, or 6, or 8 ft-lb/in (213 J/m, or 267 J/m, or 320 J/m, or 426 J/m) (or within a range from 4 or 5, or 6, or 8 ft-lb/in to 10, or 12, or 14 ft-lb/in; 213 or 426 J/m to 533, or 640, or 693 J/m). Also, the notched Izod impact at 23° C. as measured by ISO 180/A is preferably greater than 8, or 10, or 12, or 14, or 20, or 30, or 40 kJ/m$^2$ (or within a range of from 8 or 10 kJ/m$^2$ to 16, or 20, or 30, or 40, or 50, or 60 kJ/m$^2$).

The disclosure described herein can include compositions of the ICP with other polymeric materials and common additives. Desirable polymeric materials include polypropylene homopolymers (as defined above), propylene-based elastomers (such as Vistamaxx™ propylene-based elastomers), ethylene-based plastomers, elastomers such as EP rubber, EPDM, butyl rubber, styrenic copolymers and block copolymers, and other impact copolymers, especially so called "high-comonomer" impact copolymers, which are defined as propylene-based impact copolymers having greater than 44 wt % comonomer-derived units in the copolymer portion. Common "additives" include fillers such as talc, carbon black, clay, silica, fatty acids, and other well-known materials, as well as antioxidants, anti-slip agents, pigments, cavitating agents (e.g., calcium carbonate), nucleating agents, curatives for added polymers that are curable, and any other of one or more well-known additives. These polymeric materials and additives may be compounded with the ICP described herein by traditional blending such as in a Brabender mixer, or extruded in a single or double screw extruder, and can possibly be formed in to a thermoplastic vulcanizate as is well known in the art.

Suitably, the ICPs described herein are useful in protective cover applications favoring a combination of outstanding flexibility, strong bonding strength with substrates, and good mechanical performance, which is required for use as shelter from elements including wind, rain, and sunlight, etc. More particular uses of the T-ICP include tarpaulins, e.g., for protecting brickwork and masonry from weather damage.

Such ICPs may also be combined with colorants, fillers and/or other polymers such as propylene-based elastomers, other impact copolymers, or ethylene-based plastomers, any of which may individually be present from 5 wt % to 20, 30, or 60 wt %, by weight of all the components. Most preferably the T-ICP is blended only with colorants, anti-ultraviolet agents, antioxidants, and other minor additives to less than 15 wt % by weight of all the components.

In a class of embodiments, the film described herein may comprise in the coating layer an ICP, preferably a T-ICP, as defined herein, the ICP comprising a polypropylene homopolymer and within the range of from about 10 to about 45 wt % of propylene copolymer based on the weight of the ICP, wherein the propylene copolymer comprises from about 7 to about 60 wt % ethylene and/or $C_4$ to $C_{10}$ α-olefin derived units and the remainder propylene-derived units based on the weight of the propylene copolymer, the ICP having an MFR (230° C./2.16 kg) within the range of from about 10 to about 50 g/10 min and an Elongation at Break of greater than 60%. In various embodiments, the ICP may further have one or more of the following properties:

(a) a density (as measured at room temperature based on ASTM D1505) of about 0.860 to about 0.920 g/cm$^3$, or about 0.890 to about 0.910 g/cm$^3$;

(b) a total propylene-derived unit content of from about 88 to about 92 wt %, more preferably from about 90 to about 91 wt %, based on the weight of the ICP;

(c) a flexural modulus (1% Secant, as measured based on ASTM D790A) of within a range of from about 130 to about 200 kpsi, or from about 130 to about 160 kpsi, or from about 140 to about 150 kpsi;

(d) a tensile strength at yield (as measured based on ASTM D638) of from about 2500 to about 4500 psi, or from about 2600 to about 3500 psi, or from about 2800 to about 3000 psi;

(e) a notched Izod impact at 23° C. (as measured based on ISO 180/A) of greater than about 20, or about 30, or about 40 kJ/m$^2$; and (f) a heat deflection temperature (HDT) at 66 psi (as measured based on ASTM D648) of from about 75° C. to about 115° C., or from about 80° C. to about 100° C., or from about 85° C. to about 95° C.

Tensile properties of the ICP are determined according to ASTM D638, including Young's modulus (also called modulus of elasticity), yield stress (also called tensile strength at yield), yield strain (also called elongation at yield), break stress (also called tensile strength at break), and break strain (also called elongation at break). The energy to yield is defined as the area under the stress-strain curve from zero strain to the yield strain. The energy to break is defined as the area under the stress-strain from zero strain to the break strain. Injection-molded tensile bars were of either ASTM D638 Type I or Type IV geometry, tested at a speed of 2 inch/min Compression-molded tensile bars were of ASTM D412 Type C geometry, tested at a speed of 20 inch/min. For compression-molded specimens only: the yield stress and yield strain were determined as the 10% offset values as defined in ASTM D638. Break properties were reported only if a majority of test specimens broke before a strain of about 2000%, which is the maximum strain possible on the load frame used for testing.

Flexure properties of the ICP are determined according to ASTM D790A, including the 1% secant modulus. Test specimen geometry is as specified under "Molding Materials (Thermoplastics and Thermosets)", and the support span is 2 inches.

Heat deflection temperature of the ICP is determined according to ASTM D648, at 66 psi, on injection-molded specimens.

In one embodiment, the ICP in the coating layer of the film described herein is present in an amount of from about 30 to about 60 wt %, for example, about 30 wt %, about 35 wt %, about 40 wt %, about 45 wt %, about 50 wt %, about 55 wt %, about 60 wt %, or vary in the range of any combination of the values recited herein, based on total weight of polymer in the coating layer.

The various descriptive elements and numerical ranges disclosed herein for the ICPs described herein and compositions of the ICPs can be combined with other descriptive elements and numerical ranges to describe the disclosure; further, for a given element, any upper numerical limit can be combined with any lower numerical limit described herein. An element may vary in the range of any combination of the values recited herein.

Propylene-Based Elastomer

The propylene-based elastomer useful in the article described herein is a copolymer of propylene-derived units and units derived from at least one of ethylene or a $C_4$-$C_{10}$ alpha-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt %, of the propylene-based elastomer.

The units, or comonomers, derived from at least one of ethylene or a $C_4$-$C_{10}$ alpha-olefin may be present in an amount of about 1 to about 35 wt %, or about 5 to about 35 wt %, or about 7 to about 30 wt %, or about 8 to about 25 wt %, or about 8 to about 20 wt %, or about 8 to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a fractional melt mass-flow rate of about 0.5 to about 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise about 3 to about 25 wt %, or about 5 to about 20 wt %, or about 9 to about 18 wt % of ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or fractional melt mass-flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}C$ NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less.

The propylene-based elastomer may have a lower limit $H_f$ of about 0.5 J/g, or about 1 J/g, or about 5 J/g. For example, the $H_f$ value may range from a lower limit of about 1.0, 1.5, 3.0, 4.0, 6.0, or 7.0 J/g, to an upper limit of about 35, 40, 50, 60, 70, 75, or 80 J/g. The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22%, of the crystallinity of isotactic polypropylene.

Embodiments of the propylene-based elastomer may have a tacticity index m/r from a lower limit of about 4 or about 6, to an upper limit of about 8, or about 10, or about 12. In some embodiments, the propylene-based elastomer has an isotacticity index greater than 0%, or within the range having an upper limit of about 50% or about 25%, and a lower limit of about 3% or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, alkenyl norbornadienes, alkylidene norbornenes, e.g., ethylidiene norbornene ("ENB"), cycloalkenyl norbornenes, and cycloalkylene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25 to about 110° C., or about 40 to about 105° C., or about 60 to about 105° C.

Melting temperature ($T_m$) and heat of fusion ("$H_f$") are measured using Differential Scanning calorimetry (DSC). This analysis is conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. The sample was then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported herein are the peak melting temperatures from the second heat unless otherwise indicated. For polymers displaying multiple peaks, the higher melting peak temperature is reported.

Areas under the curve was used to determine the heat of fusion ("$H_f$") which can be used to calculate the degree of crystallinity. A value of 207 J/g was used as the equilibrium heat of fusion for 100% crystalline polypropylene (obtained from B. Wunderlich, "Thermal Analysis", Academic Press, Page 418, 1990). The percent crystallinity is calculated using the formula, [area under the curve (J/g)/207 (J/g)]*100.

The propylene-based elastomer may have a density of about 0.850 to about 0.900 g/cm$^3$ or about 0.860 to about 0.880 g/cm$^3$, at room temperature as measured based on ASTM D1505.

The propylene-based elastomer may have a fractional melt mass-flow rate (MFR), as measured based on ASTM D1238, 2.16 kg at 230° C., of at least about 0.5 g/10 min. In some embodiments, the propylene-based elastomer may have a fractional MFR of about 0.5 to about 20 g/10 min or about 2 to about 20 g/10 min.

The propylene-based elastomer may have an Elongation at Break of greater than about 800% to less than about 2000%, greater than about 800% to less than about 1800%, greater than about 800% to less than about 1500%, or greater than about 800% to less than about 1000%, as measured based on ASTM D638. The propylene-based elastomer may have a weight average molecular weight ($M_w$) of about 5,000 to about 5,000,000 g/mol, or about 10,000 to about 1,000,000 g/mol, or about 50,000 to about 400,000 g/mol. The propylene-based elastomer may have a number average molecular weight ($M_n$) of about 2,500 to about 250,000 g/mol, or about 10,000 to about 250,000 g/mol, or about 25,000 to about 250,000 g/mol. The propylene-based elastomer may have a z-average molecular weight ($M_z$) of about 10,000 to about 7,000,000 g/mol, or about 80,000 to about 700,000 g/mol, or about 100,000 to about 500,000 g/mol.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

The $M_w$, $M_n$ and $M_w/M_n$ were determined by using a High Temperature GPC (Agilent PL-220), equipped with three in-line detectors, a differential refractive index detector ("DRI"), a light scattering ("LS") detector, and a viscometer. Detector calibration is described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI}/(dn/dc),$$

where KDRI is a constant determined by calibrating the DRI, and (dn/dc) is the incremental refractive index for the system. The refractive index, n, was 1.500 for TCB at 145° C. and λ was 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above. Values for $M_n$ are ±50 g/mole, and for $M_w$ are ±100 g/mole.

A high temperature Viscotek Corporation viscometer, which has four capillaries arranged in a Wheatstone bridge configuration with two pressure transducers, was used to determine specific viscosity and branching. One transducer measures the total pressure drop across the detector, and the other, positioned between the two sides of the bridge, measures a differential pressure. The specific viscosity ($\eta_s$) for the solution flowing through the viscometer was calculated from their outputs. The intrinsic viscosity, [η], at each point in the chromatogram was calculated from the following equation:

$$\eta_s = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

Suitable propylene-based elastomers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins, Netherlands). The particular grade(s) of commercially available propylene-based elastomer suitable for use in the invention can be readily determined using methods commonly known in the art.

In one embodiment of the present invention, the film described herein comprises in the coating layer a propylene-based elastomer (as a propylene-based elastomer defined herein) having at least about 60 wt % propylene-derived units and about 3 to about 25 wt % ethylene-derived units, based on total weight of the propylene-based elastomer, and a heat of fusion of less than about 80 J/g. Specifically, the propylene-based elastomer may be an elastomer consisting essentially of units derived from propylene and ethylene, including propylene-crystallinity, a melting point by DSC equal to or less than 105° C., and a heat of fusion of from about 5 J/g to about 35 J/g. The propylene-derived units are present in an amount of about 80 to about 90 wt %, based on the total weight of the propylene-based elastomer. Preferably, the ethylene-derived units are present in an amount of about 11 to about 16 wt %, for example, about 11, about 11.5, about 12, about 12.5, about 13, about 13.5, about 14, about 14.5, about 15, about 15.5, about 16, based on the total weight of the propylene-based elastomer. Most preferably, the propylene-based elastomer has about 15 to about 16 wt % ethylene-derived units, based on the weight of the propylene-based elastomer.

The propylene-based elastomer present in the coating layer of the film described herein may be optionally in a blend with one or more other polymers, such as propylene-based elastomers defined herein, which blend is referred to as propylene-based elastomer composition. The propylene-based elastomer composition may include one or more different propylene-based elastomers, i.e., propylene-based elastomers each having one or more different properties such as, for example, different comonomer or comonomer content. Such combinations of various propylene-based elastomers are all within the scope of the invention.

The propylene-based elastomer in the coating layer of the film described herein may be present in an amount of from about 30 to about 60 wt %, for example, about 30 wt %, about 35 wt %, about 40 wt %, about 45 wt %, about 50 wt %, about 55 wt %, about 60 wt %, or in the range of any combination of the values recited herein, based on total weight of polymer in the coating layer.

Polyethylene Polymer

In one aspect of the invention, the polyethylene that can be used for the multilayer film made according to the method described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold under the tradenames ENABLE™, EXACT™, EXCEED™, ESCORENE™, EXXCO™, ESCOR™ PAXON™, and OPTEMA™ (ExxonMobil Chemical Company, Houston, Tex., USA); DOW™, DOWLEX™, ELITE™, AFFINITY™, ENGAGE™, and FLEXOMER™ (The Dow Chemical Company, Midland, Mich., USA); BORSTAR™ and QUEO™ (*Borealis* AG, Vienna, Austria); and TAFMER™ (Mitsui Chemicals Inc., Tokyo, Japan).

Preferred ethylene homopolymers and copolymers useful in this invention typically have one or more of the following properties:

1. a $M_w$ of 20,000 g/mol or more, 20,000 to 2,000,000 g/mol, preferably 30,000 to 1,000,000, preferably 40,000 to 200,000, preferably 50,000 to 750,000, using a gel permeation chromatograph ("GPC") according to the procedure disclosed herein; and/or 2. a $T_m$ of 30° C. to 150° C., preferably 30° C. to 140° C., preferably 50° C. to 140° C., more preferably 60° C. to 135° C., as determined by second melting curve based on ASTM D3418; and/or 3. a crystallinity of 5% to 80%, preferably 10% to 70%, more preferably 20% to 60%, preferably at least 30%, or at least 40%, or at least 50%, as determined by enthalpy of crystallization curve based on ASTM D3418 and calculated by the following formula:

Crystallinity %=Enthalpy (J/g)/298 (J/g)×100%, wherein 298 (J/g) is enthalpy of 100% crystallinity polyethylene; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 6. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 7. a Shore hardness (D scale) of 10 or more, preferably 20 or more, preferably 30 or more, preferably 40 or more, preferably 100 or less, preferably from 25 to 75 (as measured based on ASTM D2240); and/or 8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 6,956,088.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethylhexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted.

In one embodiment, the film described herein may further comprise in the coating layer an LDPE (as a polyethylene defined herein). The LDPEs that are useful in the films described herein are ethylene based polymers produced by free radical initiation at high pressure in a tubular or autoclave reactor as well known in the art. The LDPEs have a medium to broad MWD determined according to the procedure disclosed herein of higher than 4, preferably from 5 to 40, and a high level of long chain branching as well as some short chain branching. The density is generally greater than 0.910 g/cm$^3$ and is preferably from 0.920 to 0.940 g/cm$^3$. The MI may be less than 0.55 or 0.45 g/10 min. In the present invention, the coating layer may contain more than one type of LDPE.

The LDPE in the coating layer of the film described herein is present in an amount of from about 1 to about 10 wt %, for example, about 1 wt %, about 2 wt %, about 3 wt %, about 4 wt %, about 5 wt %, about 6 wt %, about 7 wt %, about 8 wt %, about 9 wt %, about 10 wt %, or in the range of any combination of the values recited herein, based on total weight of polymer in the coating layer.

Additives

The coating layer of the film described herein may also contain various additives as generally known in the art. Examples of such additives include an anti-ultraviolet agent, a color agent, an antioxidant, a thermal stabilizer, a flame retardant, a slip agent, an antiblock, a filler, a processing aid, a crosslinking catalyst, and a foaming agent, etc., and combinations thereof. Especially, the film described herein may further comprise in the coating layer functional additives suitable for particular tarpaulin applications, for example, wetting and dispersing additives. Preferably, the additives may each individually present in an amount of about 0.01 wt % to about 50 wt %, or about 0.1 wt % to about 15 wt %, or from 1 wt % to 10 wt %, based on total weight of the film layer.

Any additive useful for the multilayer film may be provided separately or together with other additive(s) of the same or a different type in a pre-blended masterbatch, where the target concentration of the additive is reached by combining each neat additive component in an appropriate amount to make the final composition.

In a preferred embodiment, the coating layer of the film described herein comprises at least one of an anti-ultraviolet agent and a color masterbatch, particularly in an amount of from about 7 to about 10 wt %, for example, about 7 wt %, 7.5 wt %, 8 wt %, 8.5 wt %, 9 wt %, 9.5 wt %, or 10 wt %, based on total weight of the coating layer.

Film Structures

The film according to the present invention may further comprise additional layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and nonwovens (particularly polypropylene spunbond fibers or nonwovens), and substrates coated with inks, dyes, pigments, and the like.

In particular, a multilayer film can also include layers comprising materials such as ethylene vinyl alcohol (EVOH), polyamide (PA), polyvinylidene chloride (PVDC), or aluminium, so as to obtain barrier performance for the film where appropriate.

In one aspect of the invention, the film described herein may be produced in a stiff oriented form (often referred to as "pre-stretched" by persons skilled in the art) and may be useful for laminating to inelastic materials, such as polyethylene films, biaxially oriented polyester (e.g., polyethylene terephthalate (PET)) films, biaxially oriented polypropylene (BOPP) films, biaxially oriented polyamide films, foil, paper, board, or fabric substrates, or may further comprise one of the above substrate films to form a laminate structure.

The thickness of the multilayer films may range from 5 to 200 µm in general and is mainly determined by the intended use and properties of the film. For example, the film may have a thickness of from 5 to 200 µm, from 10 to 150 µm, from 15 to 90 µm, or from 20 to 60 µm.

In a preferred embodiment, in addition to the coating layer, the film described herein may further comprise a substrate consisting essentially of a polypropylene homopolymer. Especially, the coating layer is coated to the substrate, preferably, at a sealing temperature of 250° C.

Methods for Making the Film

Also provided are methods for making films of the present invention. A method for making a film comprising a coating layer may comprise the steps of: (a) preparing a coating layer comprising (i) from about 30 to about 60 wt % of a propylene-based elastomer, based on total weight of polymer in the coating layer, comprising at least about 60 wt % propylene-derived units and about 3 to about 25 wt % ethylene-derived units, based on the weight of the propylene-based elastomer, wherein the propylene-based elastomer has a heat of fusion of less than about 80 J/g, (ii) from about 30 to about 60 wt % of an ICP, based on total weight of polymer in the coating layer, the ICP comprising a polypropylene homopolymer and within the range of from about 10 to about 45 wt % of propylene copolymer based on the weight of the ICP, wherein the propylene copolymer comprises from about 7 to about 60 wt % ethylene and/or $C_4$ to $C_{10}$ α-olefin derived units and the remainder propylene-derived units based on the weight of the propylene copolymer, the ICP having an MFR (230° C./2.16 kg) within the range of from about 10 to about 50 g/10 min and an Elongation at Break of greater than 60%, and (iii) from about 1 to about 10 wt % of LDPE; and (b) forming a film comprising the coating layer in step (a).

The films described herein may be formed in step (b) by any of the conventional techniques known in the art including blown extrusion, cast extrusion, co-extrusion, blow molding, casting, or extrusion blow molding. For example, the composition for preparing the films can be extruded in a molten state through a flat die and then cooled to form a film. Alternatively, the composition can be extruded in a molten state through an annular die and then blown and cooled to form a tubular, blown film, which can then be axially slit and unfolded to form a flat film. Films of the invention may be unoriented, uniaxially oriented or biaxially oriented. Physical properties of the film may vary from those of the polymer blend, depending on the film forming techniques used.

As a specific example, cast films can be prepared using a pilot scale commercial cast film line machine as follows. Pellets of the polymeric blend are melted at temperatures ranging from about 200° C. to about 300° C., with the specific melt temperature being chosen to match melt viscosities of the various resins. The melts are conveyed to a coextrusion adapter that combines the melt flows into a multilayer, coextruded structure. This layered flow is distributed through a single manifold film extrusion die to the desired width. The die gap opening is typically about 0.6 mm to about 1 mm. The material is then drawn down to the final gauge. The material draw down ratio is typically about 21:1 for films of about 50 μm. A vacuum box or air knife can be used to pin the melt exiting the die opening to a primary chill roll maintained at about 30° C.

As another example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm die with a die gap with a width from 1.4 mm to 2.5 mm, along with a dual air ring and internal bubble cooling. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

Multilayer films may be formed by methods well known in the art. The materials forming each layer may be coextruded through a coextrusion feedblock and die assembly to yield a film with two or more layers adhered together but differing in composition. Coextrusion can be adapted to cast film or blown film processes. Multiple-layer films may also be formed by extrusion coating whereby a substrate material is contacted with the hot molten polymer as the polymer exits the die. For instance, an already formed polypropylene film may be extrusion coated with an ethylene copolymer film as the latter is extruded through the die. Multilayer films may also be formed by combining two or more single layer films prepared as described above. The total thickness of multilayer films may vary based upon the application desired. A total film thickness of about 5 to about 100 μm, more typically about 10 to about 50 μm, is suitable for most applications. Those skilled in the art will appreciate that the thickness of individual layers for multilayer films may be adjusted based on desired end use performance, resin or copolymer employed, equipment capability and other factors.

Yet, in another aspect of the invention, the film described herein may be formed by extrusion coating. For example, a substrate material can be contacted with the hot molten polymer as the polymer exits the die. Extrusion coatings are generally processed at higher temperatures than cast films, typically about 200° C. to about 300° C., in order to promote adhesion of the extruded material to the substrate. Other extrusion coating processes are known in the art, including those described, for example, in U.S. Pat. Nos. 5,268,230, 5,178,960 and 5,387,630. The coating may be a monolayer film or a multilayer film. The substrate can also be stock for milk cartons, juice containers, films, etc. In one embodiment, the present invention is directed to an already formed substrate made of polypropylene homopolymer extrusion coated with the coating layer described herein or the film comprising the coating layer described herein as the latter is extruded through the die. The films and coating layers of the present invention are also suitable for use in laminate structures; i.e., with a film or a coating layer as described herein disposed between two substrates. These films and coatings are also suitable.

Desirably, the films described herein are prepared by cast extrusion. In a preferred embodiment, the film made according to the method described herein further comprises a substrate consisting essentially of a polypropylene homopolymer. Especially, the substrate is incorporated into the film described herein by coating the coating layer onto the substrate, preferably, at a sealing temperature of 250° C.

Film Properties and Applications

The inventive film described herein or made according to any method disclosed herein may have at least one of the following properties: (i) a processing neck-in ratio of at most about 28% at a die gap of 1 mm for a coating thickness of (50±10%) μm; (ii) a seal strength at a sealing temperature of 250° C. of at least about 5% higher when sealed with a substrate consisting essentially of a polypropylene homopolymer; (iii) a tensile at break of at least about 80% higher in the Machine Direction (MD) and of at least about 50% higher in the Transverse Direction (TD); (iv) an Elongation at break of at most about 20% higher in MD and of at most about 27% in TD; and (v) a puncture resistance of at least about 20% higher in force and of at least about 15% higher in energy at break, compared to that of a film comprising an alloy of polypropylene and rubber in place of the propylene-based elastomer and the impact copolymer but otherwise identical in terms of film formulation, thickness and structure.

Conveniently, the films of the present invention may be adapted to form tarpaulins for a wide variety of applications, such as, protective covers against weather damages for buildings, unenclosed road, or rail goods carrying vehicles or wood piles. Perforated tarpaulins are typically used for medium to large advertising, or for protection on scaffoldings, with the aim of the perforations (from 20% to 70%) to reduce wind vulnerability.

It has been discovered that use of the ICP highlighting toughness described herein in a blend with the propylene-based elastomer described herein in the coating layer of the inventive film can obtain bonding strength comparable to or even exceeding the level achievable with a conventional solution using high rubber content TPOs to formulate the coating layer, accompanied by desired mechanical performance. Meanwhile, beyond what can be traditionally expected from typical ICPs, tunable flexibility can be achieved with the inventive films, thus allowing for more potential in alleviating pressure from manufacture cost and short supply of the high rubber content TPO materials. Therefore, by circumventing the longstanding bottleneck associated with exploring promising alternatives to formulation design for coating layers suited to tarpaulin applications dominated by high-end TPO materials, the inventive film can conveniently deliver a coupling of advantages from both the T-ICP and the propylene-based elastomer described herein in one united film without compromising other properties, which can be very appealing to tarpaulin applications where a combination of cost-effectiveness and desired performance is highly demanded.

EXAMPLES

The present invention, while not meant to be limited by, may be better understood by reference to the following examples and tables.

Example 1

Six inventive samples (Samples 1-6), as well as a comparative sample (Comparative Sample) comprising an alloy of polypropylene and rubber in place of the propylene-based elastomer and the impact copolymer but otherwise identical in terms of film formulation, thickness and structure, were prepared by compounding on a twin-screw extruder followed by casting into films on a cast film line at a die gap of 1 mm for a coating thickness of (50±10%) μm. Neck-in ratios were compared between Samples 1-6 and Comparative Sample. Polymer products used in the samples include: T-ICP polymer (as the ICP defined herein) (density: 0.900 g/cm$^3$, MFR (230° C./2.16 kg): 30 g/10 min, 1% Secant flexural modulus: 144 kpsi, tensile strength at yield: 2940 psi, notched Izod impact at 23° C. (ISO 180/A): ~46 kJ/m$^2$, heat deflection temperature at 66 psi: ~92° C.) (ExxonMobil Chemical Company, Houston, Tex., USA); PBE1 (as the propylene-based elastomer define herein) (ethylene content: 15 wt %, density: 0.862 g/cm$^3$, MFR (230° C./2.16 kg): 20 g/10 min), and PBE2 (as the propylene-based elastomer define herein) (ethylene content: 16 wt %, density: 0.862 g/cm$^3$, MFR (230° C./2.16 kg): 3 g/10 min) (ExxonMobil Chemical Company, Houston, Tex., USA); LDPE 1C7A resin (as the polyethylene polymer defined herein) (density: 0.917 g/cm$^3$, melt index (190° C./2.16 kg): 7.0 g/10 min) (Sinopec, China); Hifax™ CA 60A TPO polymer (density: 0.88 g/cm$^3$, MFR (230° C./2.16 kg): 15 g/10 min, flexural modulus (ISO 178): 80 MPa, tensile elongation at break (ISO8986-2): 400%, deflection temperature under load (0.45 MPa, unannealed, ISO 75B-1, -2): 40° C.) (LyondellBasell Industries N.V., Netherlands).

Film formulations (based on total weight of the film) of the samples and corresponding neck-in ratios are listed below in Table 1.

As shown in Table 1, under given processing conditions as employed herein, the inventive samples managed to keep the neck-in ratio fluctuating within a reasonable range of at most about 28%, thus ensuring smooth processing on the extrusion line.

TABLE 1

Film formulations (wt %) and neck-in (%) of all samples in Example 1

| Sample No. | Formulation | Neck-in |
|---|---|---|
| 1 | PP-ICP (60)<br>PBE1 (30)<br>LDPE 1C7A (10) | 28 |
| 2 | PP-ICP (45)<br>PBE1 (45)<br>LDPE 1C7A (10) | 18 |
| 3 | PP-ICP (30)<br>PBE1 (60)<br>LDPE 1C7A (10) | 16 |
| 4 | PP-ICP (60)<br>PBE2 (30)<br>LDPE 1C7A (10) | 16 |
| 5 | PP-ICP (45)<br>PBE2 (45)<br>LDPE 1C7A (10) | 20 |
| 6 | PP-ICP (30)<br>PBE2 (60)<br>LDPE 1C7A (10) | 22 |
| Comparative | Hifax ™ CA 60A (90)<br>LDPE 1C7A (10) | 24 |

Example 2

All film samples in Example 1 were sealed with a film made of a neat polypropylene homopolymer, EXXONMOBIL™ PP3155E3 polypropylene homopolymer (density: 0.900 g/cm$^3$, MFR (230° C./2.16 kg): 36 g/10 min) (ExxonMobil Chemical Company, Houston, Tex., USA), at different sealing temperatures to test the sealing strength between the films, serving as a model of simulating adhesion between a coating layer and a polypropylene substrate in tarpaulin applications. Seal strength, expressed $F_{max}$ (N/15 mm), for all samples were measured according to the EMC method described herein and results are depicted in Table 2.

It can be seen from Table 2 that, the advantage in enhanced seal strength demonstrated by the inventive samples over the comparative sample became more remarkable as the sealing temperature increased. Particularly, when sealed at a sealing temperature as high as 250° C., the inventive samples can outperform the comparative sample by up to about 42%, indicating potential in similar capability of improvement in bonding strength with a polypropylene substrate.

TABLE 2

Seal strength (N/15 mm) between film samples in Example 1 with a polypropylene film under different sealing temperatures

| Sample No. | $F_{max}$ Sealing Temperature | | |
|---|---|---|---|
| | 210° C. | 230° C. | 250° C. |
| 1 | 9.5 | 11 | 11.7 |
| 2 | 10.4 | 14.2 | 14 |
| 3 | 10.3 | 11 | 12 |
| 4 | 13.2 | 16 | 15.8 |
| 5 | 12.1 | 13.7 | 14.9 |
| 6 | 9.8 | 9.2 | 9.7 |
| Comparative | 10.7 | 9.4 | 11.1 |

Example 3

All film samples in Example 1 were separately subject to test of mechanical properties and were conditioned at 23°

C.±2° C. and 50%±10% relative humidity for at least 40 hours prior to determination of all properties. Corresponding test results are shown below in Table 3.

Tensile properties of the films were measured by a method which is based on ASTM D882 with static weighing and a constant rate of grip separation using a Zwick 1445 tensile tester with a 200N. Since rectangular shaped test samples were used, no additional extensometer was used to measure extension. The nominal width of the tested film sample is 15 mm and the initial distance between the grips is 50 mm A pre-load of 0.1N was used to compensate for the so called TOE region at the origin of the stress-strain curve. The constant rate of separation of the grips is 5 mm/min upon reaching the pre-load, 5 mm/min to measure 1% Secant modulus (up to 1% strain), and 500 mm/min to measure yield point and 10% offset yield stress. The film samples may be tested in MD and TD.

1% Secant modulus is calculated by drawing a tangent through two well defined points on the stress-strain curve. The reported value corresponds to the stress at 1% strain (with x correction). The result is expressed as load per unit area (MPa). The value is an indication of the film stiffness in tension. The 1% secant modulus is used for thin film and sheets as no clear proportionality of stress to strain exists in the initial part of the curve. Tensile strength at break is defined as the tensile stress at break point during the extension test, expressed in load per unit area (MPa). Elongation at break is defined as the maximum elongation that can be reached at break point during the extension test, expressed in percentage (%).

Puncture resistance was measured based on ASTM D 5748, which is designed to provide load versus deformation response under biaxial deformation conditions at a constant relatively low test speed (change from 250 mm/min to 5 mm/min after reach pre-load (0.1N)). Puncture energy to break is the total energy absorbed by the film sample at the moment of maximum load, which is the integration of the area up to the maximum load under the load-deformation curve.

traditional TPO having high rubber content to secure desired bonding strength with polypropylene substrates together with well-accomplished overall mechanical performance, thus leading to favored convenience and flexibility in product design for tarpaulin applications.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A film comprising a coating layer comprising:
   (a) from about 30 to about 50 wt % of a propylene-based elastomer, based on total weight of polymer in the coating layer, comprising at least about 60 wt % of propylene-derived units and about 3 to about 25 wt % of ethylene-derived units, based on the weight of the propylene-based elastomer, wherein the propylene-based elastomer has a heat of fusion of less than about 80 J/g;
   (b) from about 30 to about 60 wt % of an impact copolymer (ICP), based on total weight of polymer in the coating layer, the ICP comprising a polypropylene homopolymer and within the range of from about 10 to about 45 wt % of a propylene copolymer based on the weight of the ICP, wherein the propylene copolymer comprises from about 7 to 30 wt % of ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from about 10 to about 50 g/10 min and an Elongation at

TABLE 3

Mechanical properties of film samples in Example 1 in MD and TD

| | Machine direction | | | | Transverse direction | | | |
|---|---|---|---|---|---|---|---|---|
| Sample No. | Tensile at break MPa | Elongation at break % | Energy to break mJ/mm³ | 1% Secant modulus MPa | Tensile at break MPa | Elongation at break % | Energy to break mJ/mm³ | 1% Secant modulus MPa |
| 1 | 24.9 | 698 | 88 | 176 | 19 | 635 | 65 | 129 |
| 2 | 33.7 | 700 | 102 | 86 | 22.8 | 756 | 81 | 75 |
| 3 | 24.2 | 598 | 67 | 46 | 18.1 | 757 | 63 | 37 |
| 4 | 44.9 | 683 | 127 | 195 | 27.3 | 754 | 97 | 146 |
| 5 | 44.4 | 653 | 108 | 89 | 27.1 | 762 | 87 | 72 |
| 6 | 39.9 | 605 | 86 | 43 | 27.7 | 808 | 86 | 36 |
| Comparative | 13.2 | 582 | 43 | 71 | 11.8 | 635 | 41 | 56 |

According to the data in Table 3, the inventive samples can display tenability in terms of flexibility as reflected by 1% Secant modulus varying in line with content of the ICP described herein, while other tensile-related properties almost all witnessed strengthened performance in the inventive samples.

Particularly, it is believed that blending ratio of the T-ICP described herein with propylene-based elastomers plays a role of establishing flexibility of the formed film. Therefore, without being bound by theory, it can be concluded that construction of a film as set out herein can reliably replace Break of greater than 60%, wherein the ICP has a heat deflection temperature at 66 psi of about 85° C. to about 95° C.; and
   (c) from about 1 to about 10 wt % of low density polyethylene (LDPE), based on total weight of polymer in the coating layer,
wherein the film has at least one of the following properties: (i) a processing neck-in ratio of at most about 28% at a die gap of 1 mm for a coating thickness of (50±10%) μm; (ii) a seal strength at a sealing temperature of 250° C. of at least about 5% higher when sealed with a substrate consisting essentially of a polypropylene homopolymer; (iii) a tensile at break of at least about 80% higher in the Machine Direction (MD) and of at least about 50% higher in the Transverse Direction (TD); (iv) an Elongation at break of at most about 20% higher in MD and of at most about 27% in TD; and (v) a puncture resistance of at least about 20% higher in force and of at least about 15% higher in energy at break, compared to that of a film comprising an alloy of polypropylene and rubber in place of the propylene-based elastomer and the impact copolymer but otherwise identical in terms of film formulation, thickness and structure.

2. The film of claim 1, wherein the propylene-based elastomer has about 11 to about 16 wt % ethylene-derived units, based on the weight of the propylene-based elastomer.

3. The film of claim 1, wherein the propylene-based elastomer has about 15 to about 16 wt % ethylene-derived units, based on the weight of the propylene-based elastomer.

4. The film of claim 1, wherein the ICP has about 90 to about 91 wt % propylene-derived units, based on the weight of the ICP.

5. The film of claim 1, wherein the ICP further has at least one of the following properties:
   (i) a 1% Secant flexural modulus of about 130 to about 200 kpsi;
   (ii) a tensile strength at yield of about 2800 to about 3000 psi; and
   (iii) a notched Izod impact at 23° C. (ISO 180/A) of greater than about 40 kJ/m$^2$.

6. The film of claim 1, wherein the coating layer further comprises at least one of an anti-ultraviolet agent and a color masterbatch.

7. The film of claim 1, further comprising a substrate consisting essentially of a polypropylene homopolymer.

8. The film of claim 7, wherein the coating layer is coated to the substrate at a temperature of 250° C.

9. The film of claim 8, wherein the film has a seal strength of at least about 5% higher than that of a film comprising an alloy of polypropylene and rubber in place of the propylene-based elastomer and the impact copolymer but otherwise identical in terms of film formulation, thickness and structure.

10. A tarpaulin comprising the film of claim 1.

11. The film of claim 1, wherein the propylene copolymer comprises from about 7 to 25 wt % ethylene and/or $C_4$ to $C_{10}$ α-olefin derived units and the remainder propylene-derived units based on the weight of the propylene copolymer.

12. The film of claim 1, wherein the propylene copolymer comprises from about 7 to 20 wt % ethylene and/or $C_4$ to $C_{10}$ α-olefin derived units and the remainder propylene-derived units based on the weight of the propylene copolymer.

13. The film of claim 1, wherein a total comonomer derived unit content of the ICP is within a range from 2 to 6 wt % by weight of the ICP.

14. The film of claim 1, wherein the propylene copolymer has a molecular weight distribution ($M_w/M_n$) within the the range from from 6 to 9.

15. The film of claim 1, wherein the coating layer consists essentially of the propylene-based elastomer, the impact copolymer, and the LDPE.

16. The film of claim 1, wherein the film has a seal strength at a sealing temperature of 250° C. of at least 5% higher when sealed with a substrate consisting essentially of a polypropylene homopolymer compared to that of a film comprising an alloy of polypropylene and rubber in place of the propylene-based elastomer and the impact copolymer but otherwise identical in terms of film formulation, thickness and structure.

17. A method for making a film comprising a coating layer, comprising the steps of:
   (a) preparing a coating layer comprising:
      (i) from about 30 to about 50 wt % of a propylene-based elastomer, based on total weight of polymer in the coating layer, comprising at least about 60 wt % of propylene-derived units and about 3 to about 25 wt % of ethylene-derived units, based on the weight of the propylene-based elastomer, wherein the propylene-based elastomer has a heat of fusion of less than about 80 J/g,
      (ii) from about 30 to about 60 wt % of an impact copolymer (ICP), based on total weight of polymer in the coating layer, the ICP comprising a polypropylene homopolymer and within the range of from about 10 to about 45 wt % of a propylene copolymer based on the weight of the ICP, wherein the propylene copolymer comprises from about 7 to 30 wt % of ethylene and/or $C_4$ to $C_{10}$ α-olefin derived units and the remainder propylene-derived units based on the weight of the propylene copolymer, the ICP having a melt flow rate (MFR) (230° C./2.16 kg) within the range of from about 10 to about 50 g/10 min and an Elongation at Break of greater than 60%, wherein the ICP has a heat deflection temperature at 66 psi of about 85° C. to about 95° C., and
      (iii) from about 1 to about 10 wt % of low density polyethylene (LDPE), based on total weight of polymer in the coating layer; and
   (b) forming a film comprising the coating layer in step (a), wherein the film has at least one of the following properties: (i) a processing neck-in ratio of at most about 28% at a die gap of 1 mm for a coating thickness of (50±10%)μm; (ii) a seal strength at a sealing temperature of 250° C. of at least about 5% higher when sealed with a substrate consisting essentially of a polypropylene homopolymer; (iii) a tensile at break of at least about 80% higher in the Machine Direction (MD) and of at least about 50% higher in the Transverse Direction (TD); (iv) an Elongation at break of at most about 20% higher in MD and of at most about 27% in TD; and (v) a puncture resistance of at least about 20% higher in force and of at least about 15% higher in energy at break, compared to that of a film comprising an alloy of polypropylene and rubber in place of the propylene-based elastomer and the impact copolymer but otherwise identical in terms of film formulation, thickness and structure.

18. The method of claim 17, wherein the film in step (b) is formed by blown extrusion, cast extrusion, co-extrusion, blow molding, casting, or extrusion blow molding.

19. The method of claim 17, wherein the film further comprises a substrate consisting essentially of a polypropylene homopolymer.

20. The method of claim 19, wherein the coating layer is coated to the substrate at a sealing temperature of 250° C.

* * * * *